United States Patent
Seko et al.

(10) Patent No.: US 8,012,264 B2
(45) Date of Patent: Sep. 6, 2011

(54) METHOD AND APPARATUS FOR CLEANING TIRE VULCANIZATION MOLD

(75) Inventors: Akikazu Seko, Hiratsuka (JP); Miyuki Saitou, Iruma-gun (JP); Toshihiko Hatanaka, Iruma-gun (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 634 days.

(21) Appl. No.: 11/988,829

(22) PCT Filed: Aug. 1, 2006

(86) PCT No.: PCT/JP2006/315238
§ 371 (c)(1), (2), (4) Date: Jan. 15, 2008

(87) PCT Pub. No.: WO2007/015496
PCT Pub. Date: Feb. 8, 2007

(65) Prior Publication Data
US 2009/0032055 A1    Feb. 5, 2009

(30) Foreign Application Priority Data
Aug. 2, 2005 (JP) .................... 2005-224582

(51) Int. Cl.
*B08B 5/00* (2006.01)
(52) U.S. Cl. ..... 134/1.1; 134/22.1; 134/123; 134/166 R; 425/225
(58) Field of Classification Search .................. None
See application file for complete search history.

(56) References Cited

U.S. PATENT DOCUMENTS

| | | | |
|---|---|---|---|
| 5,769,953 A * | 6/1998 | Yoshikawa et al. | 134/1.1 |
| 2001/0050059 A1* | 12/2001 | Hongo et al. | 118/723 MW |
| 2004/0163762 A1* | 8/2004 | Iizuka et al. | 156/345.39 |
| 2004/0221809 A1* | 11/2004 | Ohmi et al. | 118/715 |
| 2005/0022740 A1* | 2/2005 | Hatano | 118/723 E |
| 2005/0161427 A1 | 7/2005 | Okawa et al. | |

FOREIGN PATENT DOCUMENTS
JP    A 8-207056    8/1996
(Continued)

OTHER PUBLICATIONS

Machine Translation of JP11-188743 by Ono et al., published Jul. 13, 1999.*

(Continued)

*Primary Examiner* — Michael Kornakov
*Assistant Examiner* — Ryan Coleman
(74) *Attorney, Agent, or Firm* — Greer, Burns & Crain, Ltd.

(57) ABSTRACT

A tire vulcanization mold cleaning method for cleaning a molding surface of a sector of the tire vulcanization mold for molding a tread portion of a pneumatic tire by using plasma created in an atmosphere of a reaction gas which chemically reacts with dirt attached to the molding surface of the sector. The method comprises the steps of placing the sector on a electrode table in a cleaning tank with the molding surface of the sector facing a discharge electrode, supplying the reaction gas to the cleaning tank while pressure in the cleaning tank is reduced, supplying a high-frequency power to the discharge electrode to create the plasma between the discharge electrode and the molding surface of the sector, and applying to the electrode table a high-frequency voltage having a frequency lower than a high frequency wave supplied to the discharge electrode to make the electrode table generate a negative self-bias.

15 Claims, 2 Drawing Sheets

FOREIGN PATENT DOCUMENTS

| | | | |
|---|---|---|---|
| JP | A 11-19945 | | 1/1999 |
| JP | 11-188743 | * | 7/1999 |
| JP | A 2001-293729 | | 10/2001 |
| JP | 2005-023400 | * | 1/2005 |
| JP | A 2005-2432 | | 1/2005 |

OTHER PUBLICATIONS

Machine Translation of JP2005-023400 by Murakami et al., published Jan. 27, 2005.*

Machine Translation of JP2001-293729 by Seko et al., published Oct. 23, 2001.*

* cited by examiner

METHOD AND APPARATUS FOR CLEANING TIRE VULCANIZATION MOLD

TECHNICAL FIELD

The present invention relates to a method and an apparatus for cleaning a tire vulcanization mold, and more particularly, to a method and an apparatus for cleaning a tire vulcanization mold in which cleaning efficiency can be enhanced by shortening the cleaning time.

TECHNICAL BACKGROUND

In recent years, sipes having three-dimensional shapes, micro grooves, etc., have been employed for the tread patterns of winter tires in order to further enhance their properties, and the tread patterns has been getting fine. Tire vulcanization molds for vulcanizing such winter tires have sectors having molding surfaces, on which thin molding blades for molding the three-dimensionally shaped sipes and micro grooves are provided. Therefore, if cleaning is done according to a shot blasting method which cleans the molding surface of the sector by blowing plastic beads over it, a jet cleaning method with high pressure which cleans the molding surface of the sector by jetting highly pressurized water against it, or the like, a problem is that the molding blades are damaged, the shot blasting method and the jet cleaning method having conventionally been used for cleaning of the molds. As a result, there has been employed for such tire vulcanization molds a plasma cleaning method which is less in physical damage.

Conventionally, an apparatus for cleaning a tire vulcanization mold as shown in FIGS. 3 and 4, for example, is known as an apparatus which performs such plasma cleaning. This cleaning apparatus includes a cleaning tank 101 for putting therein sectors 20 of a tire vulcanization mold for molding the tread portion of a pneumatic tire, pressure reduction means 104 having a vacuum pump 102 for making negative pressure in the cleaning tank 101, a filter 102 and the like, and supply means 105 for supplying a reaction gas Q to the cleaning tank 101. A discharging upper electrode 108 and an electrode table (lower electrode) 109 are disposed in the cleaning tank 101, the upper electrode being connected to a high-frequency power source 107 via an impedance-matching device 106.

The above cleaning apparatus is designed such that sectors 120 are put on the electrode table 109, the reaction gas Q is supplied to the cleaning tank 101 by the supply means 105 in a state where negative pressure is produced inside the cleaning tank 101 by the pressure reduction means 104, plasma Z is created between the upper electrode 108 and the molding surface 120a of each sector 120 in the reaction gas atmosphere by discharging from the upper electrode 108, and dirt attached to the molding surface 120a of the sector 120 is removed by a chemical reaction of the reaction gas Q and plasma discharging (see a patent document 1, for example).

Plasma cleaning by the above-described apparatus, however, takes a longer time to clean them, compared to the conventional cleaning methods such as a shot blasting method. Particularly in the case of a vulcanization mold for winter tires which is very dirty, plasma cleaning treatment must be performed at least twice. As a result, cleaning time greatly increases, and a problem is that cleaning efficiency is substantially lowered.

Patent Document 1: Japanese Patent Application Kokai Publication 2001-293729

DISCLOSURE OF THE INVENTION

An object of the present invention is to provide a method and an apparatus for cleaning a tire vulcanization mold capable of enhancing cleaning efficiency by shortening the cleaning time.

A method of cleaning a tire vulcanization mold according to the present invention for achieving the above object is a tire vulcanization mold cleaning method for cleaning a molding surface of a sector of the tire vulcanization mold for molding a tread portion of a pneumatic tire by using plasma created in an atmosphere of a reaction gas which chemically reacts with dirt attached to the molding surface of the sector, comprising the steps of: placing the sector on a electrode table in a cleaning tank with the molding surface of the sector facing a discharge electrode; supplying the reaction gas to the cleaning tank while pressure in the cleaning tank is reduced; supplying a high-frequency power to the discharge electrode to create the plasma between the discharge electrode and the molding surface of the sector; and applying to the electrode table a high-frequency voltage having a frequency lower than a high frequency wave supplied to the discharge electrode to make the electrode table generate a negative self-bias.

An apparatus for cleaning a tire vulcanization mold according to the present invention is a tire vulcanization mold cleaning apparatus for cleaning a molding surface of a sector of the tire vulcanization mold for molding a tread portion of a pneumatic tire by using plasma created in an atmosphere of a reaction gas which chemically reacts with dirt attached to the molding surface of the sector, comprising: a cleaning tank for putting therein the sector; an electrode table provided in the cleaning tank, the sector being put thereon; pressure reduction means for reducing pressure in the cleaning tank; reaction gas supplying means for supplying the reaction gas to the cleaning tank; a discharge electrode provided in the cleaning tank; a first high-frequency power source for supplying a high-frequency power to the discharge electrode; and a second high-frequency power source for supplying to the discharge electrode a high-frequency voltage having a frequency lower than a high frequency wave supplied to the discharge electrode.

According to the present invention described above, since a high-frequency voltage having a frequency lower than a high frequency wave supplied to the upper electrode is applied to the electrode table on which the sector to be cleaned is put to thereby make the electrode table generate a negative self-bias, positive ions in the plasma created are attracted to the sector put on the electrode table at speeds higher than before, and can collide against the molding surface of the sector with high ion collision energy. Therefore, dirt attached to the molding surface of the sector can be rapidly and effectively removed, shortening the time of cleaning the sector to allow for enhancement of cleaning efficiency.

BEST MODES FOR CARRYING OUT THE INVENTION

An embodiment of the present invention will be described in detail below with reference to the attached drawings.

Figure 1:
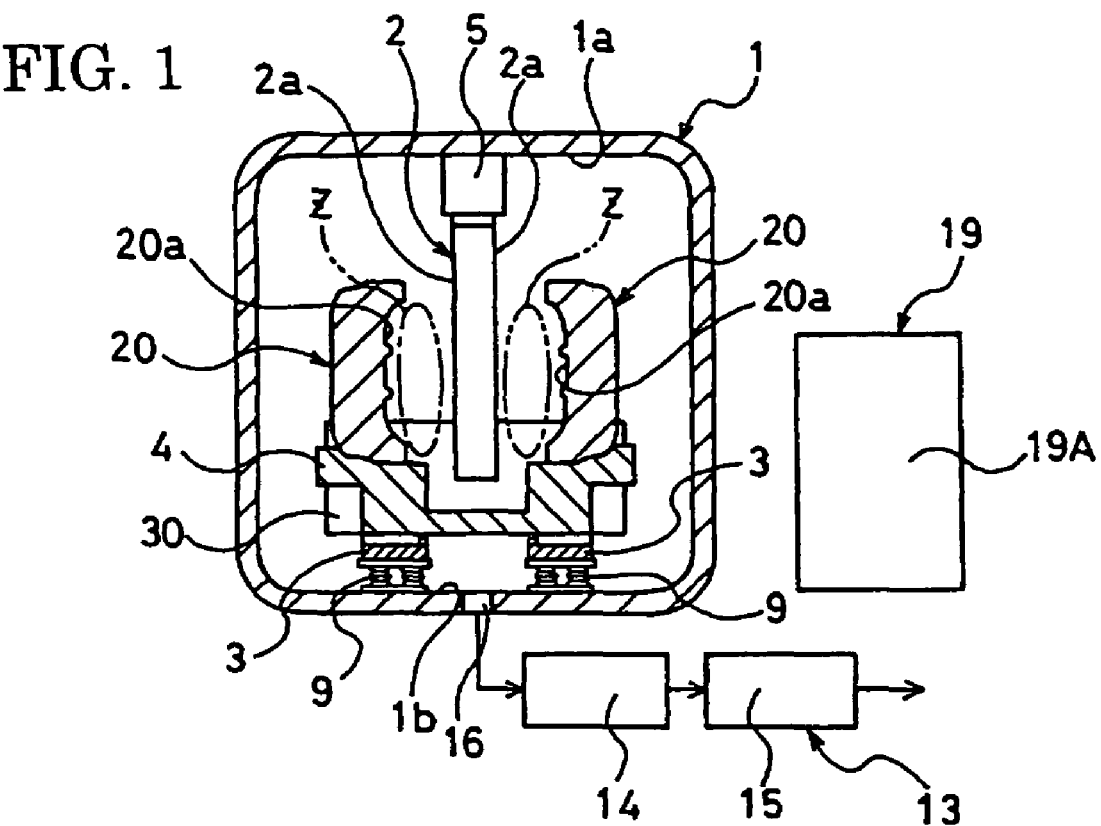
FIG. 1 is a schematic illustration showing an embodiment of an apparatus for cleaning a tire vulcanization mold according to the present invention in a state where sectors to be cleaned are placed.
Figure 2:
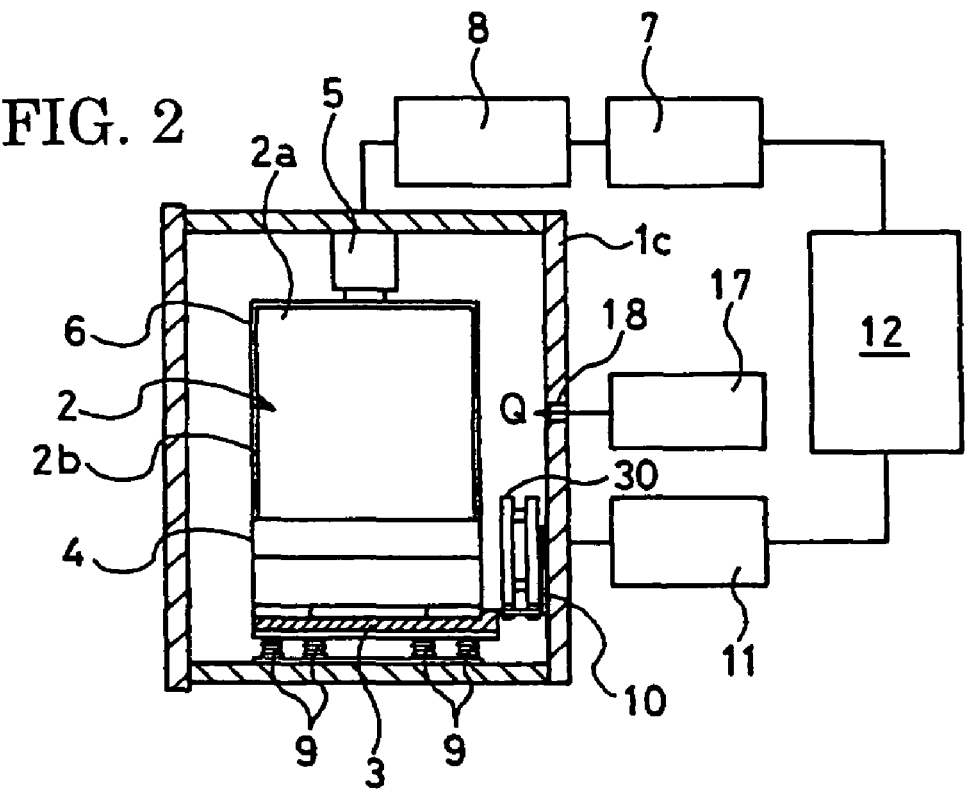
FIG. 2 is a schematic illustration when the apparatus for cleaning a tire vulcanization mold in FIG. 1 is viewed from the right direction in a state where sectors to be cleaned do not exist.
Figure 3:
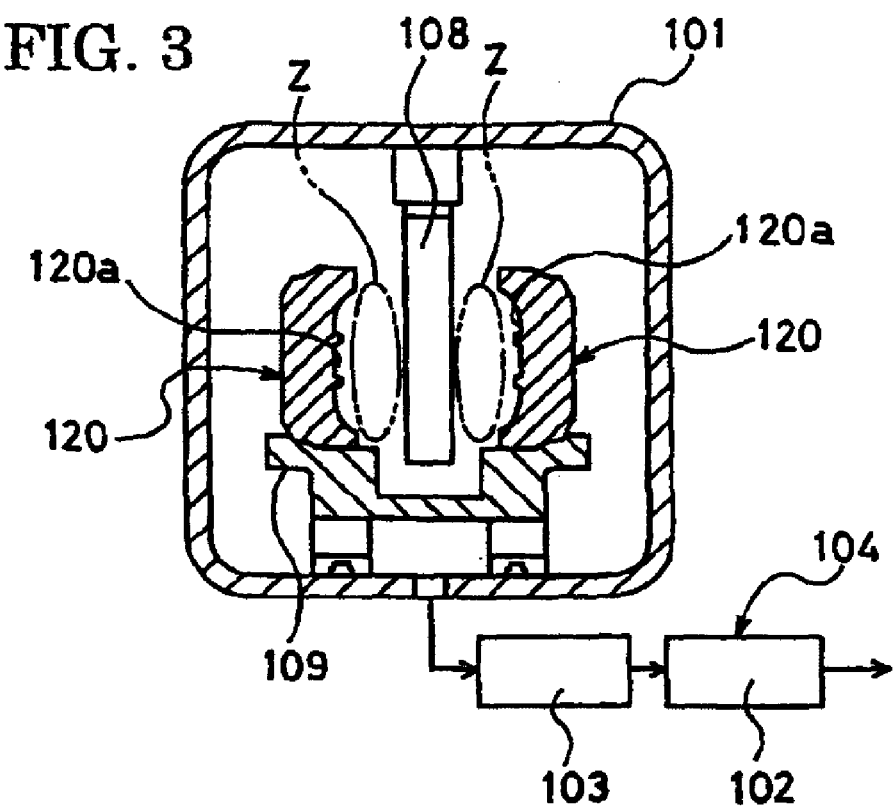
FIG. 3 is a schematic illustration showing a conventional apparatus for cleaning a tire vulcanization mold in a state where sectors to be cleaned are placed.
Figure 4:
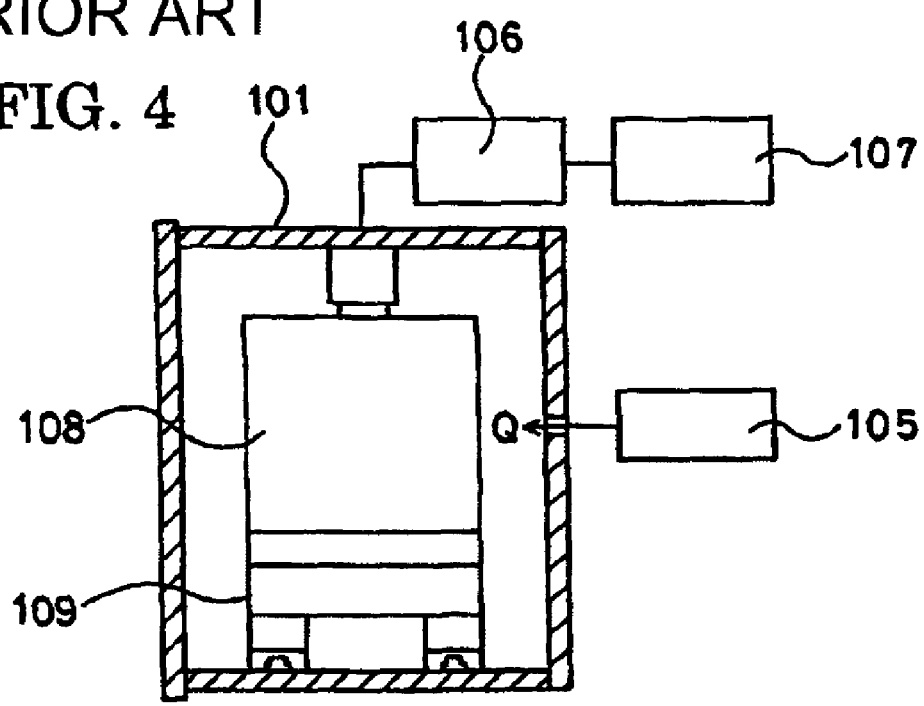
FIG. 4 is a schematic illustration when the apparatus for cleaning a tire vulcanization mold in FIG. 3 is viewed from the right direction in a state where sectors to be cleaned do not exist.

FIGS. 1 and 2 show an embodiment of an apparatus for cleaning a tire vulcanization mold according to the present invention. This cleaning apparatus is one which cleans the molding surfaces 20a of sectors 20 of a tire vulcanization mold for molding the tread portion of a pneumatic tire, using plasma created in the atmosphere of a chemical gas which chemically reacts with dirt attached to the molding surfaces 20a of the sectors 20, and includes a cleaning tank 1 for putting therein the sectors 20 to be cleaned. A discharging upper electrode 2 and an electrode table 4 connected to a lower electrode 3 are disposed in the cleaning tank 1.

The upper electrode 2, which is formed of an electrically conductive metal such as aluminum, is formed from a plate-shaped body, and hangs from a center portion of the upper surface 1a of the cleaning tank 1 via a support member 5. The upper electrode 2 has surfaces 2a facing the molding surfaces 20a of the sectors 20 put on the electrode table 4, and surfaces 2b not facing thereof. The surfaces 2b not facing thereof are covered with an electrically insulating layer 6, prohibiting electric discharge from the surfaces 2b not facing thereof. This limits plasma-created regions, enabling the used amount of a reaction gas Q and the used amount of electric power described later to be reduced.

The upper electrode 2 is electrically connected to a first high-frequency power source 7 provided outside the cleaning tank 1 via an impedance-matching device 8, and a high-frequency power is supplied to the upper electrode 2 from the first high-frequency power source 7. As the first high-frequency power source 7, a high-frequency oscillator which generates high frequency waves of 13.56 MHz established as industrial frequency by Japanese Radio Law, for example, is preferably used.

The electrode table 4 is placed via the lower electrode 3 on electric insulators 9 provided on the floor surface 1b of the cleaning tank 1. The lower electrode 3 is electrically connected to a second high-frequency power source 11 provided outside the cleaning tank 1 via a connection part 10. A high-frequency voltage having a frequency lower than the high frequency waves supplied to the upper electrode 2 from the first high-frequency power source 7 is supplied to the electrode table 4 from the second high-frequency power source 11 via the connection part 10 and the lower electrode 3 to make the electrode table 4 generate a negative self-bias.

As the second high-frequency power source 11, a high-frequency oscillator which generates high frequency waves of 40 KHz to 100 KHz is preferably used. If the high-frequency oscillator that generates high frequency waves of 40 KHz to 100 KHz is used for the second high-frequency power source 11, the period of the high frequency waves output from the second high-frequency power source 11 is long. Therefore, impedance matching is not necessary, and an impedance-matching device does not need to be electrically connected between the connection part 10 and the second high-frequency power source 11. If the frequency of the high frequency waves output from the second high-frequency power source 11 is lower than 40 KHz, and higher than 100 KHz, impedance matching is not obtained.

The first high-frequency power source 7 and the second high-frequency power source 11 are electrically connected to controlling means 12 for controlling the outputs from the first high-frequency power source 7 and the second high-frequency power source 11 in incremental steps, respectively.

Pressure reduction means 13 for making negative pressure in the cleaning tank 1 is connected to a lower part of the cleaning tank 1. This pressure reduction means 13 includes a filter 14 and a vacuum pump 15 for suctioning to make negative pressure in the cleaning tank 1. The vacuum pump 15 is connected to a suction port 16 formed in the floor surface 1b of the cleaning tank 1 via the filter 14. The gas in the cleaning tank 1 which is suctioned by the vacuum pump 15 is discharged outside the cleaning tank 1 through the vacuum pump 15. The pressure in the cleaning tank 1 is maintained at a pressure of 60 Pa to 90 Pa by the pressure reduction means 13. If the suctioning is always done so as to make the pressure in the cleaning tank 1 lower than 60 Pa, the vacuum becomes too high, which inhibits the creation of plasma because the time when a reaction gas Q, described later, supplied to the cleaning tank 1 stays near the molding surfaces 20 of the sectors 20 becomes short. On the other hand, if the pressure in the cleaning tank 1 is higher than 90 Pa, the vacuum is too low, whereby the reaction gas Q has variable reaction time and the distribution of plasma becomes uneven because a used gas after plasma reaction stays near the molding surfaces 20 of the sectors 20 and acts so as to block electric discharge.

Reaction gas supplying means 17 for supplying a reaction gas Q to the cleaning tank 1 is connected to a side portion of the cleaning tank 1. The reaction gas supplying means 17 is one which supplies a reaction gas Q which chemically reacts with dirt attached to the molding surfaces 20 of the sectors 20, and is structured such that the reaction gas Q is injected into the cleaning tank 1 between the upper electrode 2 and the sectors 20 put on the electrode table 4 from a supply port 18 formed in the side wall 1c of the cleaning tank 1. Plasma Z of the reaction gas Q is produced between the upper electrode 2 and the sectors 20 by glow discharge caused between the upper electrode 2 and the sectors 20 put on the electrode table 4.

As the reaction gas Q, a mixed gas of oxygen and carbon tetrafluoride, for example, is preferably used. If the injection pressure of the reaction gas Q is, for example, 0.15 MPa, the flow rate of oxygen can be 400 SCCM, and the flow rate of carbon tetrafluoride can be 100 SCCM.

Preheating means 19 which can preheat the sectors 20 is provided adjacent to the cleaning tank 1. The preheating means 19 has a high temperature tank 19A for preheating the sectors 20, and can heat the sectors 20 in the range of 100° C. to 160° C. in the high temperature tank 19A. Preheating of the sectors by the preheating means 19 removes dampness from the sectors 20, whereby the vacuum is stabilized early when the pressure in the cleaning tank 1 where the sectors have been placed is reduced, and the time when the temperature of the sectors 20 rises to a preset temperature can be shortened activating the plasma created. If the heating temperature is lower than 100° C., removal of dampness from the sectors 20 is not sufficient, whereby it takes time to stabilize the vacuum, and a chemical reaction speed by the plasma becomes slow because plasma energy is consumed to rise the temperature of the sectors 20. On the other hand, if the heating temperature exceeds 160° C., a problem such as handling of the sectors 20 will arise.

In the drawings, reference numeral 30 denotes an electrically insulating member disposed around the connection part 10.

A method of cleaning a tire vulcanization mold according to the present invention will be described below using the cleaning apparatus described above.

First, each sector 20 to be cleaned is preheated in the high temperature tank 19A. The heating temperature is in the range of 100° C. to 160° C. as described above. It is preferable that this preheating step be performed because of the above-mentioned reason, but it is not necessarily performed.

After the sector 20 is preheated, the preheated sector 20 is placed on the electrode table 4 in the cleaning tank 1. In doing so, the sector 20 is placed such that its molding surface 20a faces a surface 2a of the upper electrode 2.

Next, while the pressure in the cleaning tank 1 is reduced by the vacuum pump 14 of the pressure reduction means 13, the reaction gas supplying means 17 injects a reaction gas Q between the upper electrode 2 and the sector 20 put on the electrode table 4 to supply the reaction gas to the cleaning tank 1. With regard to the injection pressure and flow rate of the reaction Q, as mentioned above, if the injection pressure is about 0.15 MPa, the flow rate is about 100 SCCM to 400 SCCM. The pressure in the cleaning tank 1 is kept at a pressure of about 60 Pa to 90 Pa by the pressure reduction means 13.

In a state where the pressure in the cleaning tank 1 is reduced to the above pressure and the cleaning tank 1 is filled with the atmosphere of the reaction gas Q, a high-frequency power is supplied to the upper electrode 2 from the first high-frequency power source 7. At the same time, a high-frequency voltage is applied to the electrode table 4 from the second high-frequency power source 11. This leads to the creation of plasma Z in a space between the upper electrode 4 and the sector 20 placed on the electrode table 4. Further, a negative self-bias is generated in the electrode table 4; positive ions in the plasma Z are attracted by the negative self-bias to thereby increase their speeds, and collide against the molding surface 20a of the sector 20 put on the electrode table 4 with high ion collision energy. This leads to rapid and efficient removal of dirt attached to the molding surface 20a of the sector 20. Furthermore, a chemical reaction of ions, radial particles and the like produced by changing of the reaction gas Q with a component of the dirt attached to the molding surface 20a of the sector 20 leads to burning of the component to remove it.

Preferably, the first high-frequency power source 7 is controlled by the controlling means 12 to supply the high-frequency power to the upper electrode 2 from the first high-frequency power source 7 with a step-by-step increase of the output of the high-frequency power supplied to the upper electrode 2 from the first high-frequency power source 7. The output of the high-frequency power is increased step-by-step, for example, from 50% of the full output to 100% thereof by 10% thereof per 30 seconds or 1 minute. This leads to easy matching by the impedance-matching device 8, and the generation density of the plasma Z can be stabilized. Therefore, cleaning accuracy by the plasma Z can be increased.

It is preferable that a bias be applied to the electrode table 4 from the second high-frequency power source 11 10 seconds to 5 minutes later than the start of supply of the high-frequency power to the upper electrode 2, and that the second high-frequency power source 11 be controlled by the controlling means 12 to increase the output of the applied bias step-by-step. The output of the applied bias is increased step-by-step, for example, from 50% of the full output to 100% thereof by 10% thereof per 30 seconds or 1 minute. This allows the generation density of the plasma Z to be more stabilized. If the time-lag is less than 10 seconds, impedance matching is difficult because the plasma does not have a stable condition. On the other hand, if the time-lag is greater than 5 minutes, it is not preferable because the time for cleaning becomes long.

While the reaction gas Q is supplied to the cleaning tank 1 by the reaction gas supplying means 17 for a predetermined time period in a state where negative pressure is kept in the cleaning tank 1, plasma Z is created between the upper electrode 2 and the molding surface 20a of the sector 20 in the reaction gas atmosphere to remove dirt attached to the molding surface 20a of the sector 20.

According to the present invention described above, a high-frequency voltage having a frequency lower than the high frequency waves supplied to the upper electrode 2 is applied to the electrode table 4 on which the sector 20 to be cleaned is put to thereby make the electrode table 4 generate a negative self-bias. Therefore, positive ions in the plasma Z are attracted to the sector 20 put on the electrode table 4 at speeds higher than before, and can collide against the molding surface 20a with high ion collision energy. As a result, dirt attached to the molding surface 20a of the sector 20 can be rapidly and effectively removed. Accordingly, the time of cleaning the sector 20 is shortened and cleaning efficiency can be enhanced.

In the above-described embodiment, an example is shown of the case where a plurality of sectors 20 are cleaned. However, the present invention may include a case where one sector 20 is cleaned, and as is obvious, there is no limitation to the above-described embodiment.

INDUSTRIAL APPLICABILITY

The method and apparatus for cleaning a tire vulcanization mold according to the present invention having the aforementioned excellent effect can be very effectively utilized to clean the sectors of molds for vulcanizing pneumatic tires, particularly the sectors of molds for vulcanizing winter tires having fine tread patterns.

What is claimed is:

1. A tire vulcanization mold cleaning method for cleaning a molding surface of a sector of the tire vulcanization mold for molding a tread portion of a pneumatic tire by using plasma created in an atmosphere of a reaction gas which chemically reacts with dirt attached to the molding surface of the sector, comprising the steps of:

placing the sector on an electrode table in a cleaning tank with the molding surface of the sector facing a discharge electrode formed from a plate-shaped body, the discharge electrode having surfaces not facing the molding surface of the sector being covered with an electrically insulating layer;

supplying the reaction gas to the cleaning tank while pressure in the cleaning tank is reduced;

injecting the reaction gas into the cleaning tank between the upper electrode (the discharge electrode) and the sector put on the electrode table from a supply port formed in the side wall of the cleaning tank, supplying a high-frequency power to the discharge electrode to create the plasma between the discharge electrode and the molding surface of the sector; and applying to the electrode table a high-frequency voltage having a frequency lower than a high frequency wave supplied to the discharge electrode to make the electrode table generate a negative self-bias.

2. A method of cleaning a tire vulcanization mold according to claim 1, wherein an output of the high-frequency power supplied to the discharge electrode is increased step-by-step.

3. A method of cleaning a tire vulcanization mold according to claim 1, wherein the high-frequency voltage is applied to the electrode table at a same time when the high-frequency power is supplied to the discharge electrode.

4. A method of cleaning a tire vulcanization mold according to claim 1, wherein the high-frequency voltage is applied to the electrode table 10 seconds to 5 minutes later than starting of supply of the high-frequency power to the discharge electrode, and wherein an output of the high-frequency voltage applied to the electrode table is increased step-by-step.

5. A method of cleaning a tire vulcanization mold according to claim 1, wherein the high-frequency voltage applied to the electrode table is applied from a high-frequency oscillator which generates high frequency waves of 40 kHz to 100 kHz.

6. A method of cleaning a tire vulcanization mold according to claim 1, wherein the pressure in the cleaning tank is reduced in a range of 60 Pa to 90 Pa.

7. A method of cleaning a tire vulcanization mold according to claim 1, comprising a step of preheating the sector before the sector is placed in the cleaning tank.

8. A method of cleaning a tire vulcanization mold according to claim 7, wherein the sector is preheated in a range of 100° C. to 160° C.

9. A tire vulcanization mold cleaning apparatus for cleaning a molding surface of a sector of the tire vulcanization mold for molding a tread portion of a pneumatic tire by using plasma created in an atmosphere of a reaction gas which chemically reacts with dirt attached to the molding surface of the sector, comprising:
 a cleaning tank for putting therein the sector;
 an electrode table provided in the cleaning tank, the sector being put thereon;
 pressure reduction means for reducing pressure in the cleaning tank;
 a discharge electrode formed from a plate-shaped body, provided in the cleaning tank;
 a supply port formed in the side of the cleaning tank for supplying reaction gas to the cleaning tank between the discharge electrode and the sector put on the electrode table;
 the discharge electrode having surfaces disposed facing the molding surface of the sector and the surfaces disposed not facing the molding surface of the sector;
 the surfaces not facing the molding surface of the sector being covered with an electrically insulated material;
 a first high-frequency power source for supplying a high-frequency power to the discharge electrode; and
 a second high-frequency power source for supplying to the electrode table a high-frequency voltage having a frequency lower than a high frequency wave supplied to the discharge electrode.

10. An apparatus for cleaning a tire vulcanization mold according to claim 9, comprising an impedance-matching device electrically connected between the discharge electrode and the first high-frequency power source.

11. An apparatus for cleaning a tire vulcanization mold according to claim 9, comprising controlling means which controls outputs of the first high-frequency power source and second high-frequency power source to increase them step-by-step.

12. An apparatus for cleaning a tire vulcanization mold according to claim 9, comprising preheating means which can preheat the sector.

13. An apparatus for cleaning a tire vulcanization mold according to claim 9, wherein the discharge electrode is formed from a plate-shaped body of aluminum.

14. An apparatus for cleaning a tire vulcanization mold according to claim 9, wherein the pressure reduction means is connected to a lower portion of the cleaning tank.

15. An apparatus for cleaning a tire vulcanization mold according to claim 9, wherein the first high-frequency power source comprises a high-frequency oscillator which generates a high frequency of substantially 13.56 MHz, and wherein the second high-frequency power source comprises a high-frequency oscillator which generates a high frequency of substantially 40 KHz to 100 KHz.

\* \* \* \* \*